United States Patent [19]

Lyakov et al.

[11] Patent Number: 4,944,869

[45] Date of Patent: Jul. 31, 1990

[54] METHOD AND INSTALLATION FOR OBTAINING ENRICHED FRACTIONS FROM USED STORAGE BATTERIES

[75] Inventors: Nedyalko K. Lyakov; Georgi A. Haralampiev; Todor G. Nikolov, all of Sofia; Georgi S. Buyukliev, Kardjali; Peter S. Petrov, Kardjali; Peter V. Valchev, Kardjali; Valcho P. Myuftiev, Kardjali; Kalin T. Primov, Kardjali, all of Bulgaria

[73] Assignee: Nauchno-Installation Sektor-Vchti, Sofia, Bulgaria

[21] Appl. No.: 232,828

[22] Filed: Aug. 16, 1988

[51] Int. Cl.$^5$ ............................................... B03B 5/56
[52] U.S. Cl. .................................... 209/173; 209/452; 209/482; 241/79.1
[58] Field of Search ............... 209/173, 172, 208, 451, 209/452, 482; 241/79.1

[56] References Cited

U.S. PATENT DOCUMENTS

| 2,983,378 | 5/1961 | Hilkemeier | 209/452 X |
| 4,026,477 | 5/1977 | Tremolada | 241/17 |
| 4,159,242 | 6/1979 | Walker | 209/452 X |
| 4,512,881 | 4/1985 | Shumway et al. | 209/452 X |

FOREIGN PATENT DOCUMENTS 95198  6/1922  Switzerland ..................... 209/451

Primary Examiner—Joseph M. Gorski
Attorney, Agent, or Firm—Klein & Vibber

[57] ABSTRACT

An apparatus for obtaining enriched fractions from storage batteries is preferably three units connected in series, each of which has two concentrically disposed drums provided with helical strips on their inner wall. Concentrically to the axis of the outer drum is mounted an inner perforated drum to which are fastened perforated blades and are formed longitudinal openings over which are fixed reflectors and a screen. In its rear end, the inner perforated drum ends in a conic perforated passage to which is fastened a tube with a helical strip and outlet opening.

6 Claims, 7 Drawing Sheets

# METHOD AND INSTALLATION FOR OBTAINING ENRICHED FRACTIONS FROM USED STORAGE BATTERIES

FIELD OF THE INVENTION

The invention refers to a method and an apparatus for obtaining enriched fractions from used storage batteries with applications in metallurgy, and particularly in enrichment and separation of fractions.

BACKGROUND OF THE INVENTION

A method is known for the separation of used storage batteries such as that disclosed in U.S Pat. No. 4026477 in which the wastes are subjected to crushing to a grain size of up to 120 mm, then the crushed material is dried and sieved whereby the oxide-sulphate fraction (paste) is separated and the lumps over 120 mm are recycled back for further crushing. The sieved material is subjected to separation in suspension with water and oxide-sulphate fraction (paste) whereby it is separated as a heavy metal fraction and a light organic fraction. After the separation is carried out, a separate washing of both fractions is carried out and the organic fraction is returned for a second separation. One part of the separated oxide-sulphate fraction is used for regeneration of the suspension while the rest is fed for metallurgical processing. The heavy metal fraction is also fed into this metallurgical processing.

The apparatus for implementing this known method comprises at least two separators of a drum type which are connected in series and which are adjoined by an apparatus for crushing the used batteries, then drying and sieving them, and thereafter precipitating the suspension. This apparatus is adjoined by devices for circulation of the suspension, washing of separated fractions and storing the end product.

The disadvantages of the known method and apparatus include: preliminary elimination of the basic part of the oxidesulphate fraction is necessary after crushing of the used storage batteries, thus increasing its chlorine content and requiring additional technical equipment; there are special requirements for the grain size of crushed wastes up to 120 mm since the degree of disintegration of the metal and organic fraction including polyvinylchloride is increased; there is no detached separation of fractions present in the light fraction (ebonite and polyvinylchloride) so that there is no possibility for their secondary differentiated use; necessity for regenerating and circulation of the suspension requires additional apparatus.

SUMMARY OF THE INVENTION

An object of this invention is to provide a method and an apparatus for obtaining enriched fractions from used storage batteries under conditions of a heavy suspension based on water and an oxide-sulphate fraction from crushed storage batteries without regeneration and circulation of the suspension outside the apparatus. The method of the invention provides for the separation of various fractions using a simplified technological process. This method achieves a high quality of the enriched fractions, whereby the design of the apparatus is easily feasible, compact and rugged while ensuring improved safety of operation.

The object of the invention is attained by a method for obtaining enriched fractions from used storage batteries in which the used batteries are crushed and then subjected directly to separation in a heavy suspension of water and an oxide-sulphate fraction (paste) obtained from the crushed batteries which is converted into a heavy fraction consisting of large sized metal parts and oxide-sulphate fraction and a light fraction representing an organic fraction contaminated by an oxidesulphate component, whereby the light fraction jointly with the heavy fraction and a part of the suspension is led off while the rest of the suspension is retained for separation.

The organic fraction contaminated with an oxide-sulphate component is subjected to a second separation in a suspension of water and an oxide-sulphate fraction leading to a second heavy fraction consisting of ebonite contaminated by an oxide-sulphate fraction an d a second light fraction representing a polyvinylchloride and polypropylene fraction contaminated by an oxide-sulphate fraction.

The second light fraction is subjected to a third separation in water in order to obtain a polyvinylchloride and a polypropylene fraction.

According to the invention, the used storage batteries are crushed to a grain size of up to 300 mm; the suspension in the first separation has a specific weight from 1.65 kg/dm$^3$ to 2.20 kg/dm$^3$ and in the second separation from 1.25 kg/dm$^3$ to 1.65 kg/dm$^3$, whereby after the first separation, the heavy fraction is washed to obtain a pure large size metal fraction and a small size metal fraction which is contaminated by an oxide-sulphate fraction; these two fractions are subjected to separation and classification into a small grain metal fraction and an oxidesulphate fraction.

The second heavy fraction, which is ebonitic and contaminated by an oxide-sulphate component, as well as the second light fraction which is polyvinylchloridic and polypropylenic contaminated by an oxide-sulphate component, are subjected separately to washing to obtain a pure ebonite fraction, a polyvinylchloride and polypropylene fraction, and an oxide-sulphate fraction.

After the third separation, the polyvinylchloride and polypropylene fraction are washed separately to obtain a pure polyvinylchloride fraction and a polypropylene fraction.

The advantage of the method of this invention is its high degree of selectivity due to the fact that the used batteries are separated into their initial products as well as the high quality of the final products which are obtained in a pure state thereby realizing their secondary differentiated specific use. There is no need for regeneration and circulation of the suspension as it is constantly being renewed and its specific weight is maintained in a stable manner. The requirements of the grain size of the crushed material are in a larger range since it is only necessary to disrupt the connections between elements of the storage battery.

The object of the invention is attained by an apparatus for obtaining enriched fractions from used batteries comprising three units connected in series, each of which consists of two concentrically disposed drums provided with helical strips mounted on their inner wall. The outer drum consists of a cylindric part with an inlet opening at its front end. Its back end is closed by means of a perforated partition with an intermediate opening at its peripheral part. To the cylindric part, behind the perforated partition, there is mounted a conic part ending in an outgoing annular opening. At the end of the conic part behind the annular opening, a perforated cylinder is mounted so that laterally at the level of its axial line and beneath it are formed at least two nozzles with angles from 30° to 80°. The perforated cylinder is closed by means of a jacket which has in its upper part, beneath its axial line, an outgoing opening, while in its lower part in a plane perpendicular to the axial line of the cylinder, there is mounted an inclined worm. Along the length of the outer drum on its inner side in the zone of the cylindric part there is disposed a single helical strip and in the zone of the conic part—a double helical strip. The inner drum has a cylindric part and is closed at the front end tightly while in the zone of the cylindric part of the outer drum longitudinal openings are disposed. Ladling blades are mounted over these openings. Reflectors are also mounted on the device and in addition a conic part is provided to which is fastened another cylindric part (tube) which ends with an outlet opening. The cylindric part of the inner drum and the tube in the zone behind the perforated cylinder are perforated, whereas on the inner wall, along the whole length of the inner drum, there is mounted a single helical strip which is perforated in its front with respect to the tube there is mounted a second perforated cylinder over which there are formed at least two nozzles at angles from 100° to 180°. On the outer wall in the back part of the outer drum between the inlet opening and the beginning of the inner drum there are mounted at least three stirring blades which are disposed at least in two annular rows while along the perforated partition over the intermediate opening there is mounted a screen.

There is provided at least one perforated cylinder and the cylinders are disposed one after the other. The openings of the perforated partition and of the conic perforated passage are parallelepipedic and are disposed in a checkered manner, while the openings of the perforated cylindric part of the inner drum, of the perforated cylinders and the perforated part of the tube are circular and checkered, whereby, in two adjacent rows, the area of openings whose centers form equilaterial triangles is 5 to 7 times smaller than the area of the respective triangle.

The advantages of the apparatus according to this invention include: compactness of design; high quality of the final products; no need for additional equipment for regeneration and circulation of the suspension and washing of the fractions; easy maintenance of constant specific weight of the suspension; good working conditions due to ease of handling and complete automation of processes; and good sanitary-hygienic conditions with protection of work-site and environment from harmful contaminants.

BRIEF DESCRIPTION OF THE DRAWINGS

With these and other objects in view, which will become apparant in the following detailed description, the present invention, which is drawn by example only, will be clearly understood in connection with the accompanying drawing, in which.

DETAILED DESCRIPTION

Figure 1:
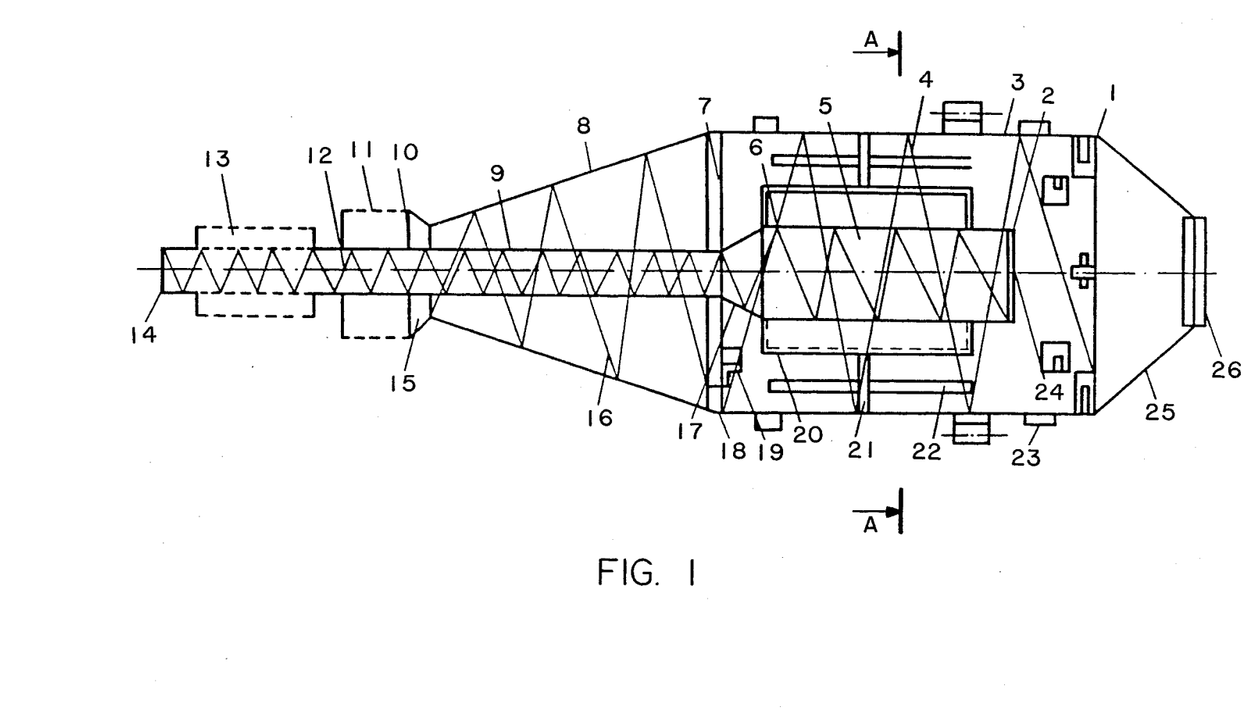
FIG. 1 is a longitudinal schematic cross-sectional view.
Figure 2:
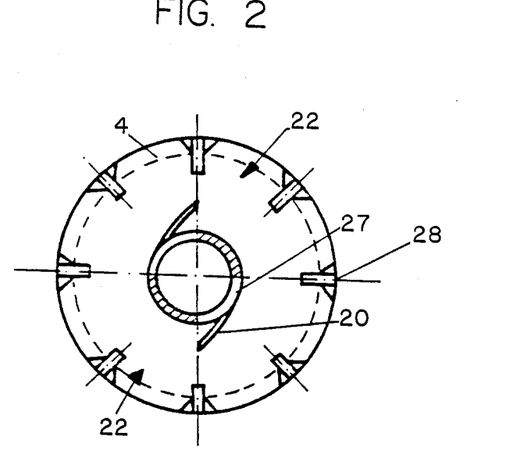
FIG. 2 is a sectional view along line A—A from FIG. 1.
Figure 3:
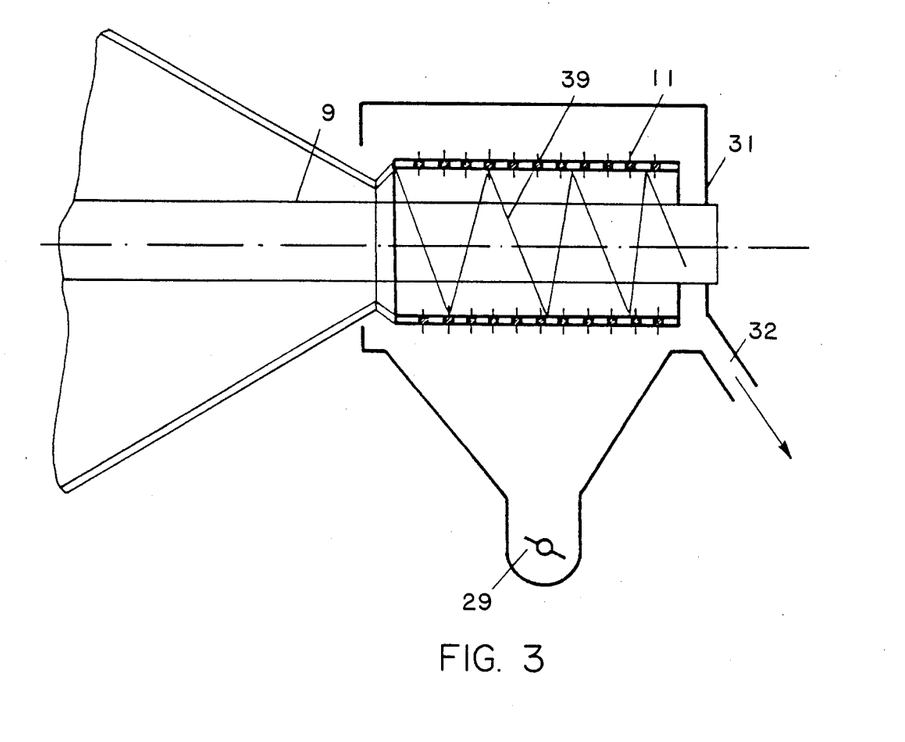
FIG. 3 is a cross-sectional view of a unit for washing and classification of the heavy fraction.
Figure 4:
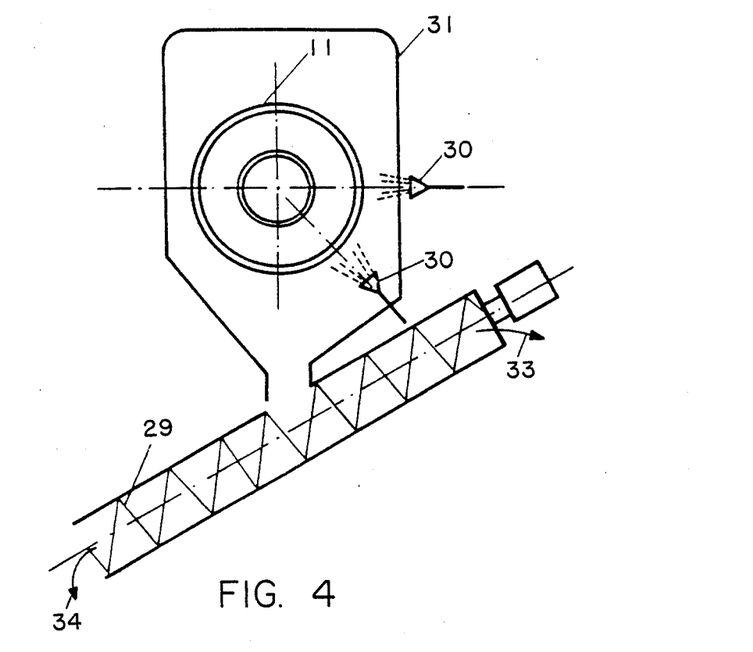
FIG. 4 is an orthogonal cross section of the unit illustrated in FIG. 3.
Figure 5:
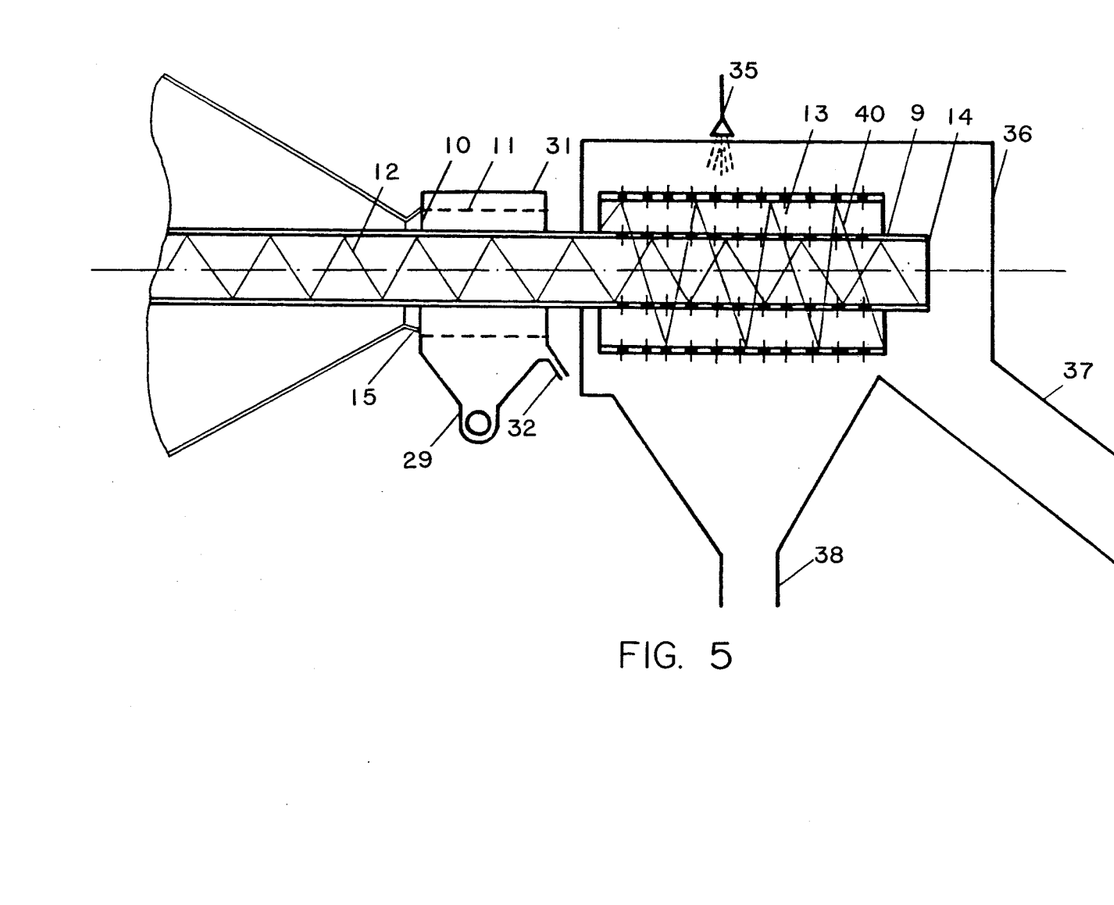
FIG. 5 is a cross-sectional view of the unit for washing and sieving of the light fraction.
Figure 6:
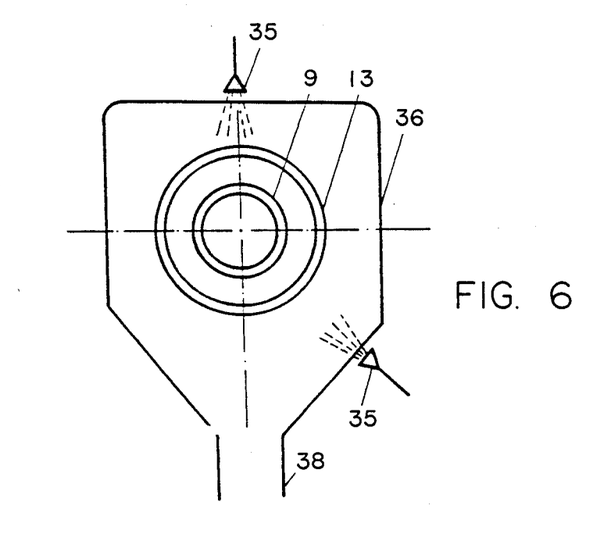
FIG. 6 is an orthogonal cross sectional view of FIG. 5.
Figure 7:
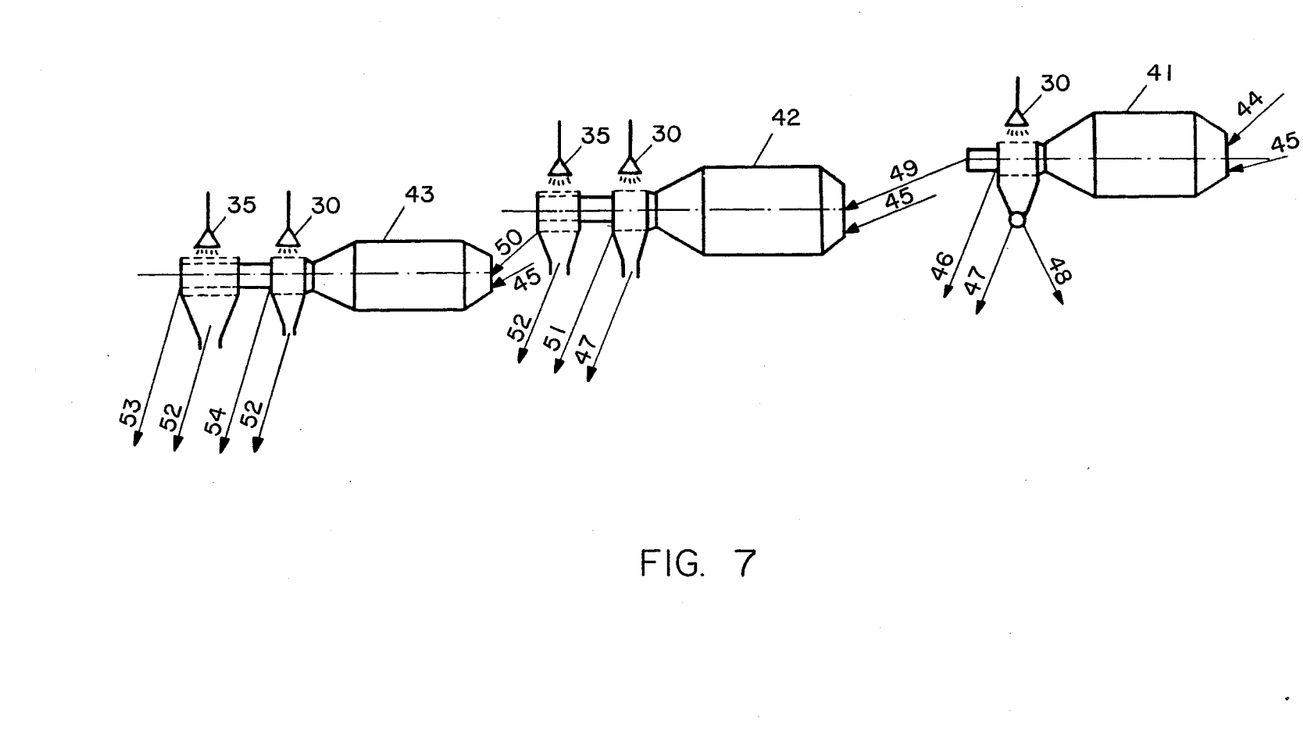
FIG. 7 is a schematic view of an apparatus for obtaining five enriched fractions from used storage batteries: metal (large and small sized), oxide-sulphate, ebonite, polyvinylchloride, and polypropylene.

Referring now to the drawing, an exemplary implementation of the apparatus for realizing the method comprises three units 41, 42, 43 arranged serially each of which consists of two concentrically disposed drums, i.e. an outer drum 1 and an inner drum 2 (see FIG. 1). The outer drum 1 consists of a cylindric part 3 on the inner wall on which is mounted a single helical strip 4. To the front part of the cylindric part 3 is fastened a lid 25 with inlet opening 26; a conic part 8 is mounted against the other end of the cylindric part 3 along the inner wall on which is mounted a double helical strip 16. The conic part 8 has at its end an annular coaxial opening 10 with a reverse cone 15 to which is fixed a small perforated cylinder 11 with a helical strip 39 (see FIG. 3). Laterally in relation to the axial line two nozzles 30 are mounted at angles of 45° with respect to each other for spraying liquid into the cylinder 11. The perforated cylinder 11 is enclosed by a jacket 31 which has an outlet opening 32 for discharging the washed large sized metal fraction, while in its lower part in a plane perpendicular to the axial line there is mounted an inclined worm 29 with an outlet opening for discharging washed small sized metal fractions 33 and an outlet opening for discharging oxide-sulphate fractions 34. Between the cylindric part 3 and the conic part 8 there is mounted a perforated partition 7 with intermediate opening 18 disposed in the zone of helical strips 4 and 16 over which is fastened a screen 19. The cylindric part 3 has mounted on its outer wall supporting rings 23, while at the front end of the inner wall of the lid 25 stirring blades 28 (see FIG. 2) are mounted. An inner perforated drum 2 is coaxially mounted and fastened in a fixed manner to the outer drum 1 by means of ribs 21. This perforated drum 2 includes a cylindric part 5 on the inner wall of which is mounted a single helical strip 6, while on the outer wall are fixed perforated blades 20. In the base of the drum 2, on the cylindric part 5 itself, there are formed longitudinal openings 27, while over them in the zone of the single helical band 4 are mounted reflectors 22. At its front end the inner perforated drum 2 is closed by means of a bottom 24, while at its rear end it has a conic perforated passage 17 on the inner wall of tube 9 there is mounted a helical strip 12. A large perforated cylinder 13 is coaxially mounted relative to the tube 9 which is disposed in the zone behind the small perforated cylinder 11. The perforated cylinder 13 is provided with a helical strip 40, while laterally to it are mounted two nozzles 35 spaced at an angle of 120° from each other (see FIG. 6). Perforated cylinder 13 is enclosed by a jacket 31 and in its rear part there is an opening 37 for discharging washed and sieved organic fractions and below it there is an opening 38 for oxidesulphate fraction. The openings of perforated partition 7 and of conic perforated passage 17 are parallelepipedic and disposed in a checkered manner while on the cylinder part 5 of inner drum 2, on the small perforated cylinder 13 and on the perforated part of tube 9, concentrically to it, they are circular with checkered placement so that in two adjacent rows the area of the openings whose centers form equilateral triangles is 5 to 7 times smaller than the area of the respective triangle.

MANNER OF OPERATION

The exemplary apparatus for realizing the method operates in the following manner: Three units 41, 42 and 43 are serially arranged; two of the units 41 and 42 are charged in advance with oxide-sulphate fractions and water and the third unit 43 is charged only with water. The units 41–43 are started by means of a drive to effect a rotary movement. Through opening 26 crushed battery wastes 44 are fed leaving a grain size of up to 300 mm. Water 45 is fed with a flow necessary to maintain a specific weight of the suspension from 1.65 kg/dm$^3$ to 2.20 kg/dm$^3$. The stirring of the material is performed by means of blades 28, whereby the light fraction (organic fraction) floats on the surface while the heavy fraction (metal fraction) remains on the inner wall of outer drum 1. This fraction, by means of a single helical strip 4, is pushed to partition·7 and through intermediary opening 18 over which there is a screen 19 for retaining casually present light fractions; the fractions arrive in the conic part 8 from where, by means of a double helical strip 16, it is transported to the annular opening 10 from where it comes into the perforated drum 11 where washing takes place. Then, as an enriched metal fraction 46, it runs out through opening 32. The oxide-sulphate fraction 47, separated by the perforated drum, arrives on an inclined worm 29 by means of which, with the small size metal fraction 48 separated therefrom and as an enriched fraction, it enters a sedimentation pool. Light fraction (organic fraction) 49 is ladled by blades 20 and with the help of reflectors 22 through the longitudinal opening 27 it enters the inner drum 2. Thereafter it is transported by means of the single helical strips 6 and 12 and arrives in a perforated drum 13 where washing and double sieving takes place and then as an enriched fraction it runs out through discharge opening 37. The separated enriched oxide-sulphate fraction flows out through discharge opening 38 into a sedimentation pool.

In order to separate the organic part 49 into its fractions the crude non-washed organic fraction 49 enters a second unit 42 into which is fed water 45 with necessary flow to maintain the specific weight of the suspension from 1.25 kg/dm$^3$ to 1.65 kg/dm$^3$. The mixture of polypropylene and polyvinylchloride fraction 50 floats on the surface while the ebonite fraction 51 remains on the inner wall of outer drum 1. According to a procedure analogous to the one described hereinabove, both fractions after washing and sieving of the light fraction are led away in an enriched state. The obtained oxide-sulphate fraction 47, which is present in minimal amounts, flows along with the washing waters 52 into the sedimentation pool. Afterwards the mixture of polypropylene and polyvinylchloride fraction 50 enters a third unit 43 in which there is only water 45. The polypropylene fraction 53 floats on the surface while the polyvinylchloride fraction 54 remains on the inner wall of outer drum 1. According to a procedure analogous to the preceding one both fractions are led out after washing.

The water which is used to realize the described processes is recycled with a concomitant process in order to compensate for humidity of the final products (enriched fractions).

In order to separate only polypropylene from the organic fraction 49, the latter, after its separation in unit 41, enters a second unit 42 in which there is only water 45. Polypropylene fraction 53 floats on the surface while the mixture of ebonite 47 and polyvinylchloride fraction 54 remains on the inner wall of outer drum 1. According to a procedure analogous to this described hereinabove, both fractions after washing and sieving of the light fraction are led out as enriched fractions.

We claim:

1. An apparatus for obtaining enriched fractions from used storage batteries having a plurality of units arranged in series, each unit comprising two concentrically disposed drums, namely an outer cylindrical drum and an inner cylindrical perforated drum;

said cylinder having a first helical strip mounted on its inner wall, a lid with inlet opening fastened to a front part of said cylinder, a first cone fixed at a rear part of said cylinder, said first cone having a second helical strip mounted on its inner wall;

the first cone ending in an annular opening with a second inverse cone;

a perforated partition with an intermediate opening is disposed between said cylinder and said first cone;

the cylinder being provided with reinforcing rings on its outer wall;

in the front end of the inner wall at the lid a plurality of stirring blades are mounted, while the inner perforated drum is mounted, fixed by means of ribs;

said inner perforated drum having a third helical strip mounted on an inner wall thereof;

perforated blades being fastened to the outer wall of said inner perforated drum;

longitudinal openings being formed at the base of said blades within the cylinder;

the front end of the inner perforated drum being closed by a bottom; reflectors being mounted over the longitudinal openings; and a screen being fixed over the intermediate opening;

a small perforated cylinder, which is closed by a jacket having an opening, being fastened to the inverse cone; and an inclined worm being mounted to a lower part of said small perforated cylinder, in a plane perpendicular to an axial line of the small perforated cylinder;

the inner perforated drum ending in a conic perforated passage to which is fastened a tube with a fourth helical strip and an outlet opening;

while concentrically to the tube, which is perforated in a zone after the small perforated cylinder, there being fastened a large perforated cylinder which is closed by a jacket with a first opening and a second opening, while over the small and large perforated cylinders are disposed nozzles.

2. Apparatus according to claim 1, wherein the second helical strip is a symmetric double helical strip starting 180° after the first helical strip.

3. Apparatus according to claim 1, wherein there are at least two nozzles per unit; said nozzles are at an angle of 30° to 80° with respect to each other; and are disposed laterally and beneath the level of the axial line of the small perforated cylinder.

4. Apparatus according to claim 1, wherein there are at least two nozzles per unit; said nozzles are at an angle from 100° to 180° with respect to each other; and are laterally disposed to the large perforated cylinder.

5. Apparatus according to claim 1, wherein the openings of perforated partition are parallelepipedic and disposed in a checkered manner.

6. Apparatus according to claim 1, wherein the openings of the the inner cylindrical perforated drum, of the small perforated cylinder; of the large perforated cylinder; and of the perforated part of the tube are circular with a checkered disposition, whereby in two adjacent rows the area of openings are 15–25% of the respective intervening area of of the inner cylindrical perforated drum, the small perforated cylinder, the large perforated cylinder, and the perforated part of the tube.

* * * * *

UNITED STATES PATENT AND TRADEMARK OFFICE
CERTIFICATE OF CORRECTION

PATENT NO. : 4,944,869

DATED : July 31, 1990

INVENTOR(S) : Nedyalko K. Lyakov, Georgi A. Haralampiev, Todor G. Nikolov, Georgi S. Buyukliev, Peter S. Petrov, Peter V. Valchev, Valcho P. Myuftiev and Kalin T. Primov It is certified that error appears in the above-identified patent and that said Letters Patent is hereby corrected as shown below:

Cover page, column 1, item [73], line 1, after "Assignee:" delete the name of the Assignee which was already printed, and substitute therefor --Nauchno-Issledovatelski Sektor-Vchti--.

Signed and Sealed this

Ninth Day of April, 1991

Attest:

HARRY F. MANBECK, JR.

*Attesting Officer*     Commissioner of Patents and Trademarks